United States Patent
Kruger et al.

(10) Patent No.: US 7,355,813 B2
(45) Date of Patent: *Apr. 8, 2008

(54) METHOD OF FABRICATING A NARROW PROJECTION SUCH AS A WRITE POLE EXTENDING FROM A SUBSTRATE

(75) Inventors: James Kruger, Half Moon Bay, CA (US); Benjamin L. Wang, San Jose, CA (US); Patrick R. Webb, San Jose, CA (US); Howard G. Zolla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/053,632

(22) Filed: Feb. 8, 2005

(65) Prior Publication Data

US 2005/0147793 A1  Jul. 7, 2005

Related U.S. Application Data

(62) Division of application No. 10/121,989, filed on Apr. 12, 2002, now Pat. No. 6,859,998.

(51) Int. Cl.
*G11B 5/31* (2006.01)
*G11B 5/127* (2006.01)
*H04R 31/00* (2006.01)

(52) U.S. Cl. ............. 360/110; 29/603.07; 428/815.2; 360/112; 360/122; 360/317

(58) Field of Classification Search ............. None
See application file for complete search history.

(56) References Cited

U.S. PATENT DOCUMENTS

| | | | |
|---|---|---|---|
| 5,595,941 A | 1/1997 | Okamoto et al. | 437/228 |
| 5,618,383 A | 4/1997 | Randall | 430/314 |
| 5,667,632 A | 9/1997 | Burton et al. | 438/570 |
| 5,688,723 A | 11/1997 | Okamoto et al. | 437/228 |
| 5,885,750 A * | 3/1999 | Hsiao et al. | 430/314 |
| 6,043,960 A | 3/2000 | Chang et al. | 360/126 |
| 6,054,023 A | 4/2000 | Chang et al. | 204/192.2 |
| 6,156,487 A * | 12/2000 | Jennison et al. | 430/316 |
| 6,423,475 B1 * | 7/2002 | Lyons et al. | 430/314 |
| 6,540,928 B1 * | 4/2003 | Kobrin et al. | 216/22 |

(Continued)

*Primary Examiner*—Kevin M. Bernatz
(74) *Attorney, Agent, or Firm*—William D. Gill; Jeffrey P. Aiello

(57) ABSTRACT

An article is formed as a substrate having a projection extending outwardly therefrom. The article may be a magnetic recording head and the projection a write pole. The projection has a width in a thinnest dimension measured parallel to a substrate surface of no more than about 0.3 micrometers and a height measured perpendicular to the substrate of not less than about 5 times the width. The article is fabricated by forming an overlying structure on the substrate with an edge thereon, depositing a replication layer lying on the edge, depositing a filler onto the edge and the substrate, so that the filler, the replication layer, and the overlying structure in combination comprise a continuous layer on the substrate, selectively removing at least a portion of the replication layer from a free surface of the continuous layer inwardly toward the substrate, to form a defined cavity, and depositing a projection material into the defined cavity to form the projection.

5 Claims, 3 Drawing Sheets

U.S. PATENT DOCUMENTS

| | | |
|---|---|---|
| 6,862,798 B2 * | 3/2005 | Kruger et al. ........... 29/603.13 |
| 6,877,213 B2 * | 4/2005 | Zolla ....................... 29/603.12 |
| 2001/0000917 A1 | 5/2001 | Arndt et al. ................ 257/209 |

* cited by examiner

METHOD OF FABRICATING A NARROW PROJECTION SUCH AS A WRITE POLE EXTENDING FROM A SUBSTRATE

BACKGROUND OF THE INVENTION

1. Field of the Invention

This invention relates to the fabrication of a narrow projection extending from a substrate and, more particular, to the fabrication of write poles for magnetic recording heads, and to such structures. This application is a divisional of application Ser. No. 10/121,989 that was filed on Apr. 12, 2002 now U.S. Pat. No. 6,859,998.

2. Description of the Related Art

A read/write head of a magnetic storage device such as a computer hard disk is positioned closely adjacent to the recording medium, separated from the recording medium by an air bearing that does not allow them to touch. A data bit is written onto an area, usually a track, of the recording medium using the writing portion of the read/write head by locally changing its magnetic state. That magnetic state is later sensed by the magnetoresistance sensor of the read/write head to read the data bit. Read/write heads are known in the art, and typical read/write heads are described, for example, in U.S. Pat. Nos. 3,908,194 and 6,043,960, whose disclosures are incorporated by reference.

The write portion of the read/write head typically includes an electromagnet with a pair of pole pieces. The pole pieces are projections that extend essentially perpendicular to the surface of a substrate to a height above the substrate of at least several times the width of the pole pieces. The width of the pole pieces approximates the width of the track in the recording medium. The narrower the track, the narrower are the pole pieces. A continuing objective in the development of such magnetic storage devices is to increase the areal density of information stored. One way to achieve this goal is to reduce the width of the recording tracks on the magnetic storage medium. To reduce the width of the recording tracks, the width of the pole pieces of the write portion of the read/write head must be correspondingly reduced.

A number of techniques are known for fabricating the pole pieces of the write head. These approaches require that the pole pieces be defined by photolithographic techniques at a dimensional scale comparable with the scale of the pole piece itself. The available lithographic techniques are satisfactory and operable when the pole pieces have width dimensions on the order of 1 micrometer. However, as the width dimensions are reduces to the order of ½ micrometer or less, the spatial resolution available with conventional photolithographic techniques becomes inadequate to define the pole pieces.

There is a need for an approach to fabricating a structure in the form of a projection extending above the substrate to a height of at least several times the width of the projection, where the width of the projection is very small. The present invention fulfills this need, and further provides related advantages.

SUMMARY OF THE INVENTION

The present invention provides a method for fabricating a structure comprising a projection extending outwardly from a substrate, as well as such articles. In a typical case, the height of the projection is at least several times the width, and the width is very small. The approach does not require the use of photolithographic techniques with a spatial resolution comparable with the width of the projection, so that the width is not limited by the spatial resolution of photolithography. The present approach is particularly well suited to the fabrication of pole pieces for magnetic write heads.

In accordance with the invention, a method of fabricating an article comprising a projection extending outwardly from a substrate comprises first forming an overlying structure on the substrate with an edge on the overlying structure. The overlying structure may be formed, for example, by depositing a hard-baked resist overlying the substrate, depositing a hard mask layer overlying the hard-baked resist layer, depositing an imaging resist layer overlying the hard mask, removing a portion of the imaging resist layer to form a step therein so that the hard mask layer is exposed in a n area where the imaging resist layer is removed, and removing portions of the hard mask and the hard-baked resist layer that underlie the step in the imaging resist layer. The forming of the overlying structure usually includes forming the edge oriented perpendicular to the substrate. It may also include depositing a seed layer onto a surface of the substrate in preparation for the depositing of the projection material.

A replication layer is deposited lying on the edge, preferably by a conformal deposition technique. The width of the projection is determined by the thickness of the replication layer, which is preferably no more than about 0.3 micrometers. This approach to defining the width of the projection involves deposition of a selected thickness of material, which is much more readily accomplished than attempting to define the width by photolithography, in those cases where the width is to be very small.

A filler is deposited onto the edge and the substrate, so that the filler, the replication layer, and the overlaying structure in combination comprise a continuous layer on the substrate. The filler is preferably deposited by applying a filler material overlying the structure formed in the step of depositing the replication layer, and planarizing the filler material, the replication layer, and the overlying structure to define the free surface. The continuous layer has a free surface with a side of the replication layer exposed at the free surface.

The method further includes selectively removing at least a portion of the replication layer from the free surface inwardly toward the substrate, to form a defined cavity, and depositing a projection material into the defined cavity to form the projection. The selective removal is preferable accomplished by removing the portion of the replication layer by a technique which does not remove the filler and the overlying structure, such as reactive ion etching with an appropriate atmosphere. The projection material may be deposited by any operable approach, but electrodeposition onto a previously deposited electrodepostion seed layer is preferred. In the applications on interest to the inventors, the projection is a write pole of a magnetic recording head, and the projection material is a ferromagnetic such as a NiFe or NiFeCo alloy.

After the projection material is deposited to form a column of the projection material laterally supported by the remaining portions of the filler and the overlying structure. At least a portion of the remaining filler and overlying structure is desirably removed, so that at least a part of the length of the projection is laterally unsupported. Preferably, all of the remaining filler and overlying structure is removed.

An article according to the invention comprises a substrate having a projection extending outwardly therefrom. The projection preferably has a width in a thinnest dimension measured parallel to a substrate surface of no more than about 0.3 micrometers and a height measured perpendicular to the substrate surface of not less than 5 times the width. That is, the projection is in the form of a column that extends upwardly from the substrate surface to a height of at least several times its width. The projection preferably has a shape of a rectangular prism. Other features as described above may be present in the article.

The only photolithography normally involved in the present approach is to remove a portion of the imaging resist, thereby defining the location of the edge in the overlying structure. This photolithography step defines an edge, not recess or cavity, and accordingly does not require photolithography with a high spatial resolution. The reduction of the width of the projection is therefore not limited by the resolution available with photolithographic techniques. Instead, the width of the projection is defined by the thickness of the replication layer that is deposited onto the edge. The deposition of a thin layer of a precisely defined thickness is known in the art for other purposes.

The present approach therefore provides an article and a technique for producing the article, where the article is in the form of the narrow projection extending above the surface of the substrate. Such an approach is particularly useful in fabricating the poles of the write head of a magnetic read/write apparatus. Other features and advantages of the present invention will be apparent from the following more detailed description of the preferred embodiment, taken in conjunction with the accompanying drawings, which illustrate, by the way of example, the principles of the invention. The scope of the invention is not, however, limited to this preferred embodiment.

DETAILED DESCRIPTION OF THE INVENTION

Figure 1:
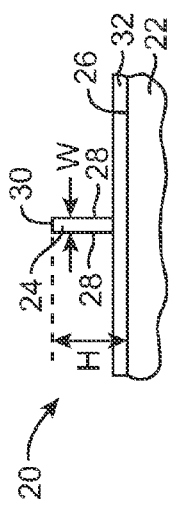
FIG. 1 is an elevational view of an article including a substrate and a projection extending outwardly from the substrate.

FIG. 1 depicts an article 20 including a substrate 22 having a projection 24 extending outwardly from a surface 26 of the substrate. The projection 24 is preferably in the form of a rectangular prism with parallel sides 28 and a top 30. The projection extends out of the plane of the illustration to opposing ends that are parallel to the plane of the illustration. The projection 24 has a width between the parallel sides 26 of W, and a height from the substrate surface 26 to the top 30 of H. In FIG. 1, the substrate surface 26 has a thin seed layer thereon, which is used in the formation of the projection 24. A thickness of the seed layer 32 is on the order of about 0.1 micrometers. Although it is not so limited, the present invention finds its greatest value when W is small, preferably no more than about 0.3 micrometers, and H is not less than about 5 times W, and preferably about 5-10 times W. The projection 24 preferably is a write pole of a magnetic recording head. In that application, the projection is made of a ferromagnetic projection material such as a NiFe or a NiFeCo alloy.

Figure 2:
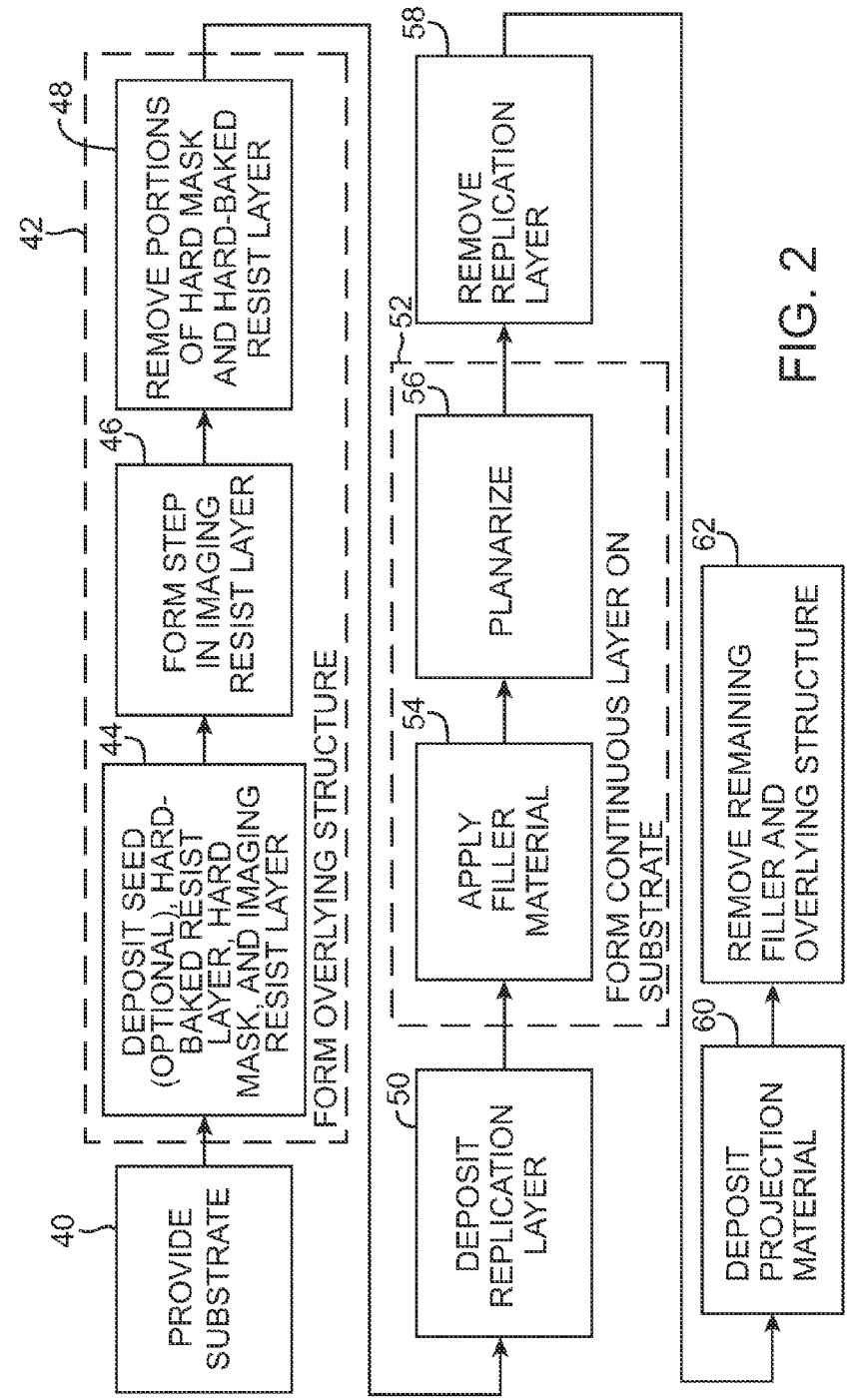
FIG. 2 is a block flow diagram of an approach for producing the article of FIG. 1.

FIG. 2 is a block flow diagram of a preferred approach for fabricating the article 20. The figure shows a presently preferred sequence of fabrication steps, although other stepwise procedures that produce a comparable result may be used as well. FIGS. 3-11 show the structure at various points in the fabrication process of FIG. 2. FIGS. 1 and 3-11 are schematic and are not drawn to scale.

Figure 3:
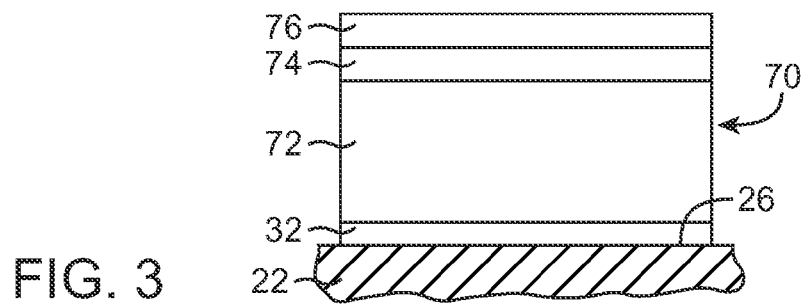
FIGS. 3-11 are schematic elevational views of the structures at various points in the fabrication of the article of FIG. 1 by the approach of FIG. 2.
Figure 6:
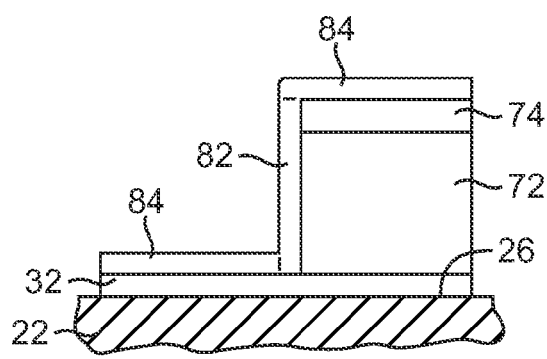

The substrate 22 shown in FIG. 3 is provided, numeral 40 of FIG. 2. The substrate 22 may be of any operable type or material. In the preferred application, it is underlying structure below the pole piece of the write head of the magnetic recording head, such as shown in FIG. 6, 16 or 18 of the '960 patent.

An overlying structure 70 is formed on the substrate 22, numeral 42 of FIG. 2. The forming step 42 may be accomplished by any operable technique. In a preferred approach shown in FIG. 2 with the structures of FIGS. 3-5, the seed layer 32 is first deposited on to the surface 26 of the substrate 22, numeral 44 of FIG. 2. The seed layer 32 is optional, and is used where required for a later step of depositing the projection material. This embodiment of the deposition step 44 of FIG. 2 of the overlying structure also includes depositing a hard-baked resist layer 72 overlying the seed layer 32, depositing a hard mask layer 74 overlying the hard-baked resist layer 72, and depositing an imaging resist 76 layer overlying the hard mask 74. FIG. 3 illustrates the resulting overlying substrate 22.

Any operable materials of the construction for the layers 32, 72, 74 and 76 may be used. Preferred materials are discussed next, for the case where the projection 24 is the write pole. The seed layer 32 is selected according to the nature of the projection material. For the case of a ferromagnetic projection materials such as NiFe or NiFeCo deposited by electrodeposition, the preferred approach discussed subsequently, the seed layer 32 preferably NiIFe deposited by sputtering, and it is about 800-100 Angstroms thick. The hard-based resist layer 72 is preferably Novolac, a resist material known in the art for other applications. The Novolac is spun on and baked at a temperature of about 200 C. The thickness of the Novolac is selected according to the required height H of the projection 24. The hard mask layer 74 is preferably a mask material such as TaO, $SiO_2$, or SiN, deposited by sputtering or chemical vapor deposition (CDV), in a thickness of about 2500 Angstroms. The imaging resist layer 76 is preferably a commercial resist such as Clariant AZ7905, applied by spinning in a thickness of about 0.5 micrometers.

Figure 4:
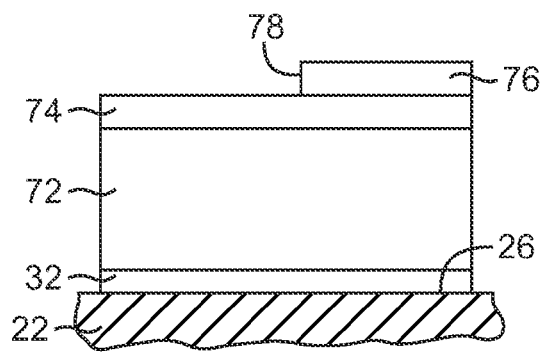
Figure 5:
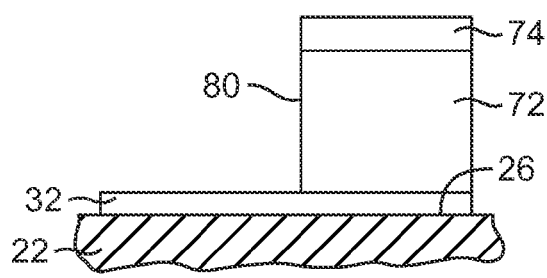

A portion of the imaging resist layer is a photographically patterned using conventional exposure and development procedures and thence removed to form a step 78 therein, numeral 46 of FIG. 2. The recommended procedures for the commercial resist material are used. The upper surface of the hard mask layer 74 is thereby exposed in an area where the imaging resist layer 76 is removed, as seen in FIG. 4.

The portions of the hard mask layer 74 and the hard-baked resist layer 72 defined by the step 78 and that underlie the step are removed by any appropriate procedure, numeral 48 of FIG. 2. As used herein, "underlie the step" refers to the region that is exposed when the step is defined, i.e., to the left of and below the step of 78 in FIG. 4. The result is an edge 80 whose face is oriented perpendicular to the substrate surface 26. The preferred removal approach 48 is to remove the exposed portion of the hard mask layer 74 with reactive ion etching (RIE) in a fluorinated gas such as $CHF_3$, and thereafter to remove the exposed portion of the hard-baked resist layer 74 in an oxygenated gas such as $O_2$ or CO. The result of these two removal substeps is to remove those portions of the hard mask layer 74 and the hard-baked resist layer 72 that lie to the left of the step 78 in FIG. 4, producing the structure shown in FIG. 5, without significantly attacking or removing the seedlayer 32 and the substrate 22 (if no seed layer is present).

A replication layer 82 is deposited to lie on the edge 80, step 50 of FIG. 2. As seen in FIG. 6, the replication layer 82 is the portion of the material deposited on the edge 80 and does not included any excess replication material 84 that may be deposited on the hard mask layer 74 and/or the seed layer 32 (or the substrate 22 if no seed layer is present). The deposition 50 is preferable accomplished by a technique which preferentially deposits the replication layer on the edge 80, such as ion beam deposition at a glancing angle such as 60 degrees from normal. A conformal deposition technique such as chemical vapor deposition may also be used. The thickness of the replication layer 82, measured perpendicular to the edge 80, deposited in this step 50 ultimately determines the width W of the projection 24. Thus, this width W is established by a deposition process, not the resolution of a photolithography process. Photolithography is used in patterning the imaging resist layer 76, but that patterning is only of a line that defines the step of 78. By contrast, many other types of processes use photolithographic patterning to define a pair of closely spaced lines that in turn establish the width of the feature, and these processes are therefore limited by the spatial resolution of the photolithographic process. The present approach yields its greatest advantages when the width W of the projection 24 is no greater than about 0.3 micrometers, the practical limit of the spatial resolution of photolithographic processes for the high-aspect ratio features.

In the presently preferred approach, the replication material deposited to form the replication layer 82 is TaO, SiO$_2$, or Si$_3$N$_4$. These materials, the same types as used in the hard mask layer 74, are not attacked by the removal processes that are used to remove laterally adjacent layers in subsequent steps. In the presently preferred approach, the replication material is selected to be removed by reactive ion etching in a fluorine-containing environment, but is not attacked by reactive ion etching in an oxygen or carbon monoxide environment.

Figure 7:
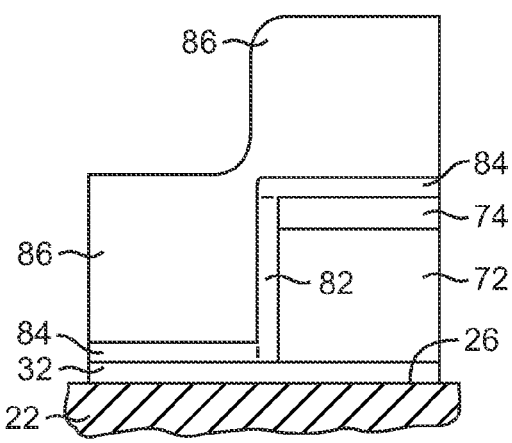
Figure 8:
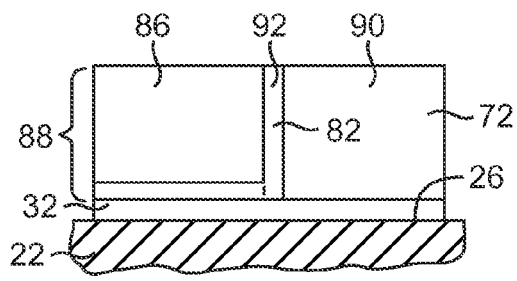
Figure 9:
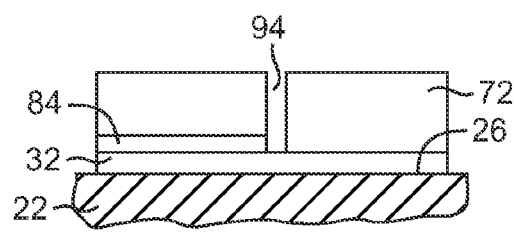

As seen in FIG. 6, the processing to this point produces the edge with the replication layer 82 thereon. A continuous layer is next formed on the substrate 22, numeral 52 of FIG. 2, by depositing a filler 86 onto the edge 80 and the substrate 22. The filler 86 and the replication layer 82 (both to left of the edge in FIGS. 7-8), and the remaining overlying structure (to the right of the edge in FIGS. 7-8) in combination comprise a continuous layer 88 on the substrate 22. The continuous layer 88 has a free surface 90 with a side 92 of the replication layer 82 exposed at the free surface 90. This structure is conveniently produced by applying the filler material, which is preferably the same material used as the hard-baked resist layer 72, by spinning, then baking the filler material as recommended for the material, numeral 54 of FIG. 2. Step 54 leaves an irregular surface, as shown in FIG. 7. The surface is planarized, numeral 56 of FIG. 2, to produce the generally planar free surface 90 as shown in FIG. 8 by any convenient approach, with chemical mechanical polishing (CMP) preferred. FIG. 8 shows the excess replication material 84 and the hard mask layer 74 that overlie the hard-baked resist layer 72 as being removed in this step 56. Alternatively, either or both of these layers 84 and 74 could remain after the step 56.

The replication layer 82 is selectively removed from the free surface 90 inwardly toward the substrate 22 by a technique which does not substantially remove the filler 86 and the remaining portions of the overlying structure 70, numeral 58 of FIG. 2, although there may be some minor incidental attack. This removal forms a defined cavity 94 whose sides are the filler and the remaining portions of the overlying structure 70, see FIG. 9. The step 58 exposes the seed layer 32 (or the substrate surface 26 if no seed layer 32 is present) at a bottom of the defined cavity 94. The removal step 58 is performed by a technique that removes the material of the replication layer but does not attack the other layers that are present (other than the hard mask layer 74 if still present after step 56). For the preferred materials discussed earlier, this removal may be accomplished by reactive ion etching in an oxygen or carbon monoxide environment. The RIE may be accomplished by conventional reactive ion etching or anisotropic reactive ion etching, both techniques known in the art for other applications.

Figure 10:
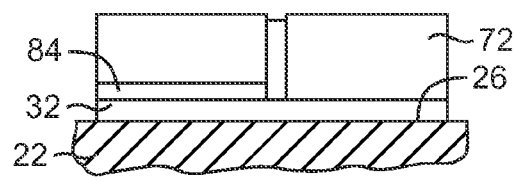

A projection materials is deposited into the defined cavity, numeral 60 of FIG. 2, producing a column of the projection material that is laterally supported on its sides as shown in FIG. 10. In the preferred case where the projection material is a NiFe or NiFeCo and the projection 24 is the write pole of a magnetic recording head, the deposition step 60 is accomplished by electrodeposition onto the seed layer 32 at the bottom of the defined cavity 94 to form the projection 24 seen in FIG. 11. The seed layer serves to nucleate the deposition of the projection 24 with a desired crystallographic orientation. Such electrodeposition techniques are known in the art for other applications, see, for example U.S. Pat. No. 5,582,927, whose disclosure is incorporated by reference.

Figure 11:
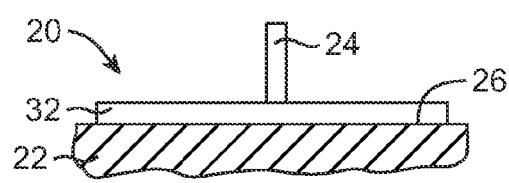

At least a portion of any remaining filler 86, excess replication material 84, overlying structure 70 is removed, numeral 62 of FIG. 2, so that at least a part of the length (extending above the surface 26) of the projection 24 is laterally unsupported. That is, the projection 24 extends above the surface of any remaining material. All of the remaining filler 86, hard-baked resist layer 72, excess replication material 84, and overlying structure 70 (but not the seed layer 32, if any) are preferably removed, as shown in FIG. 11, producing the structure shown in FIG. 1 wherein the projection 24 is completely without lateral support. However, in other cases some of the material overlying the seed layer 32 (if present) and the substrate 22 other than the projection 24, may be left in place to provide a degree of lateral support for the projection 24 over the lower portion of its length. For the preferred materials discussed earlier, the removal step 62 is preferably accomplished by reactive ion etching or plasma stripping. The present approach readily produces projections 24 of very small width W, such as about 0.1 micrometers or less. At the same time, the height H of the projection is several times as great as is W, and typically no less than about 5 times W.

Although a particular embodiment of the invention has been described in detail for purposes of illustration, various modifications and enhancement may be made without departing from spirit and scope of the invention. Accordingly, the invention is not to be limited except as by the appended claims.

What is claimed is:

1. A magnetic write pole comprising:
a projection comprising a rectangular prism extending outwardly from a substrate, said projection comprising a laterally unsupported portion and a laterally supported portion, said projection having a width in a thinnest dimension measured parallel to a surface of the substrate of not more than about 0.3 micrometers and a height measured perpendicular to said substrate surface of not less than about 5 times the width, said laterally supported portion of said projection in direct contact with a filler and a replication layer formed on the substrate, fabrication of said projection comprising:

forming an overlying structure on the substrate, the overlying structure having an edge thereon, wherein forming the overlying structure includes:
  depositing a hard-baked resist layer overlying the substrate;
  depositing a hard mask layer overlying the hard-baked resist layer;
  depositing an image resist layer overlying the hard mask;
  removing a portion of the imaging resist layer to form a step in the imaging resist layer, the hard mask layer being exposed in an area where the imaging resist layer is removed; and
  removing portions of the hard mask and the hard-baked resist layer that underlie the step in the imaging resist layer;
depositing a replication layer lying on the edge;
depositing a filler onto the edge and the substrate so that the filler, the replication layer, and the overlying structure in combination comprise a continuous layer on the substrate, the continuous layer having a free surface with a side of the replication layer exposed at the free surface;
selectively removing at least a portion of the replication layer from the free surface inwardly toward the substrate, to form a defined cavity; and
depositing a projection material into the defined cavity to form the laterally supported portion of said projection, the laterally supported portion of said projection in direct contact with the filler, replication layer, and substrate wherein the filler comprises a hard-baked resist material, and the replication layer comprises a replication material that is not attacked by a process used to selectively remove laterally adjacent layers in subsequent process steps, the replication material selectively etched by ion etching in a fluorine-containing atmosphere and not attacked by ion etching in an oxygen or carbon monoxide atmosphere.

2. The magnetic write pole of claim 1 wherein the projection is made of a ferromagnetic material.

3. A magnetic write pole comprising:
  a projection extending outwardly from a substrate, the projection comprising a laterally unsupported portion and a laterally supported portion, the projection having a width in a thinnest dimension measured parallel to a surface of the substrate of not more than about 0.3 micrometers and a height measured perpendicular to the substrate surface of not less than about 5 times the width, the laterally supported portion of the projection in direct contact with a filler and a replication layer formed on the substrate, the filler comprising a hard-baked resist material, and the replication layer comprising a replication material that is not attacked by a process used to selectively remove laterally adjacent layers in subsequent process steps, the replication material selectively etched by ion etching in a fluorine-containing atmosphere and not attacked by ion etching in an oxygen or carbon monoxide atmosphere.

4. The magnetic write pole of claim 3 wherein the projection comprises a rectangular prism.

5. The magnetic write pole of claim 3 wherein the projection is made of a ferromagnetic material.

* * * * *